(12) United States Patent
Kim et al.

(10) Patent No.: US 12,021,225 B2
(45) Date of Patent: Jun. 25, 2024

(54) ELECTRODE ASSEMBLY HAVING IMPROVED SAFETY OF USE BY MEANS OF EXTERIOR MATERIAL PATTERN STRUCTURE, AND LITHIUM-ION SECONDARY BATTERY HAVING SAME

(71) Applicant: LiBEST INC., Daejeon (KR)

(72) Inventors: Joo Seong Kim, Daejeon (KR); Jin Hong Ha, Daejeon (KR); Gil Ju Lee, Daejeon (KR)

(73) Assignee: LIBEST INC., Daejeon (KR)

( * ) Notice: Subject to any disclaimer, the term of this patent is extended or adjusted under 35 U.S.C. 154(b) by 164 days.

(21) Appl. No.: 16/765,994

(22) PCT Filed: Nov. 21, 2018

(86) PCT No.: PCT/KR2018/014329
§ 371 (c)(1),
(2) Date: May 21, 2020

(87) PCT Pub. No.: WO2019/103446
PCT Pub. Date: May 31, 2019

(65) Prior Publication Data
US 2020/0280045 A1   Sep. 3, 2020

(30) Foreign Application Priority Data

Nov. 22, 2017 (KR) ........................ 10-2017-0156384

(51) Int. Cl.
*H01M 4/36* (2006.01)
*H01M 4/02* (2006.01)
(Continued)

(52) U.S. Cl.
CPC ....... *H01M 4/364* (2013.01); *H01M 10/0525* (2013.01); *H01M 50/105* (2021.01);
(Continued)

(58) Field of Classification Search
CPC ..... H01M 50/509–512; H01M 50/536; H01M 2004/021; H01M 2004/027; H01M 2004/028
See application file for complete search history.

(56) References Cited

U.S. PATENT DOCUMENTS 11,043,703 B1 * 6/2021 Zeng .................... H01M 50/209
2013/0101884 A1 * 4/2013 Ueda ................. H01M 10/0583
429/127

(Continued)

FOREIGN PATENT DOCUMENTS

JP         2000173559 A        6/2000
KR       20160042796      *   4/2016   ............ H01M 10/04
(Continued)

OTHER PUBLICATIONS

Machine Translation of Tatsuki (Year: 2000).*
(Continued)

*Primary Examiner* — Matthew T Martin
*Assistant Examiner* — Ankith R Sripathi
(74) *Attorney, Agent, or Firm* — HSML P.C.

(57) ABSTRACT

A lithium ion secondary battery according to the present disclosure includes: an electrode assembly; and a case having a structure in which upper stamped portions and lower stamped portions are repeatedly stamped to cover the outside of the electrode assembly, and the upper stamped portions and the lower stamped portions form a corrugated pattern, and the electrode assembly includes: one or more unit cells each equipped with a pair of electrodes having different polarities with a separator interposed therebetween; an electrode mixture coated on one or both surfaces of the pair of electrodes; and electrode tabs protruded from the respective electrodes and not coated with the electrode mixture, and the electrode tabs include an electrode parallel connection tab and an electrode lead connection tab, and any (Continued)

one or more of the electrode parallel connection tab and the electrode lead connection tab is formed on the electrodes, and the corrugated pattern has various intervals.

8 Claims, 8 Drawing Sheets

(51) Int. Cl.
| | |
|---|---|
| *H01M 10/0525* | (2010.01) |
| *H01M 50/105* | (2021.01) |
| *H01M 50/136* | (2021.01) |
| *H01M 50/46* | (2021.01) |
| *H01M 50/54* | (2021.01) |
| *H01M 50/547* | (2021.01) |
| *H01M 50/553* | (2021.01) |
| *H01M 50/566* | (2021.01) |

(52) U.S. Cl.
CPC ......... *H01M 50/136* (2021.01); *H01M 50/46* (2021.01); *H01M 50/54* (2021.01); *H01M 50/547* (2021.01); *H01M 50/553* (2021.01); *H01M 50/566* (2021.01); *H01M 2004/027* (2013.01); *H01M 2004/028* (2013.01)

(56) References Cited

U.S. PATENT DOCUMENTS

| | | | |
|---|---|---|---|
| 2016/0118640 A1* | 4/2016 | Miyake | H01M 50/553 |
| | | | 429/163 |
| 2017/0077480 A1 | 3/2017 | Hwang et al. | |
| 2020/0136121 A1* | 4/2020 | Allen | H01M 50/516 |

FOREIGN PATENT DOCUMENTS

| | | |
|---|---|---|
| KR | 1020160090104 A | 7/2016 |
| KR | 1020170019970 A | 2/2017 |
| KR | 101783703 B1 | 10/2017 |
| KR | 101789066 B1 | 10/2017 |

OTHER PUBLICATIONS

Machine Translation of Yun (Year: 2016).*
International Search Report of PCT/KR2018/014329, dated Feb. 28, 2019, in English.

* cited by examiner

CRACK  DESORPTION

BENDING OUTER DIAMETER :
CASING EXPANSION

BENDING INNER DIAMETER :
CASING CONTRACTION

FIG. 8

ELECTRODE ASSEMBLY HAVING IMPROVED SAFETY OF USE BY MEANS OF EXTERIOR MATERIAL PATTERN STRUCTURE, AND LITHIUM-ION SECONDARY BATTERY HAVING SAME

TECHNICAL FIELD

The present disclosure relates to a technique for inducing cutting of the outermost electrode equipped with an electrode lead connection tab and a parallel connection tab before the breakage of a case forming a battery and an internal short circuit occur by adjusting pattern intervals of the case and thus for securing the safety in use in order to prevent the risk of ignition or explosion caused by the breakage of the case and the internal short circuit which are mechanical problems of the battery and may occur due to bending and distortion, which is a repeated external force, in a flexible environment.

BACKGROUND

A secondary battery refers to a battery which can be charged and discharged, as opposed to a primary battery which cannot be charged, and has been widely used in the field of advanced electronic device fields such as cellular phone, notebook computer, camcorder, and the like. As the portable electronic devices are manufactured lighter with improved performance and the Internet of Things (IoT) advances, a lot of studies are being conducted on secondary batteries used as power supplies therefor.

Particularly, a lithium secondary battery has a higher voltage than a nickel-cadmium battery or a nickel-hydrogen battery mainly used as power supplies for portable electronic devices and also has a high energy density per unit weight. Therefore, demand for lithium secondary batteries is on the increase.

The secondary battery utilizes an electrochemical reaction occurring between an electrolyte and a negative electrode and a positive electrode when the negative electrode and the positive electrode are connected to each other while they are inserted into the electrolyte. Unlike conventional primary batteries, the secondary battery is a chargeable and dischargeable battery which can be recharged with energy by a charger and used again when energy is consumed by an electronic device. Therefore, the use of secondary batteries has increased with the popularization of wireless electronic devices.

Typically, a jelly-roll type electrode assembly in which a separator is inserted between a positive electrode and a negative electrode and then spirally wound together, or a flexible stacked type electrode assembly in which multiple positive electrodes and negative electrodes are stacked with a separator interposed therebetween has been used as the lithium secondary battery. For example, a cylindrical battery is manufactured by housing the jelly-roll type electrode assembly in a cylindrical can, injecting an electrolyte thereinto, and sealing the can, and a prismatic battery is manufactured by pressing the jelly-roll type electrode assembly or the stacked type electrode assembly to be flat and housing the flat electrode assembly in a prismatic can. Further, a pouch type battery is manufactured by packing the jelly-roll type electrode assembly or the stacked type electrode assembly together with an electrolyte in a pouch type case. In such an electrode assembly, a positive electrode tab and a negative electrode tab are withdrawn from a positive electrode and a negative electrode, respectively, to the outside of the electrode assembly and then connected to a negative electrode and a positive electrode of a secondary battery.

Meanwhile, in a conventional pouch type lithium secondary battery, a case forming an outer side of the lithium secondary battery is damaged by an intentional force applied from the outside, and, thus, an electrolyte accommodated in the case leaks out and outside air flows into the case. The leakage of the electrolyte inhibits normal operations of peripheral components such as a battery protection circuit by, for example, corroding the peripheral components. Also, the inflow of the outside air causes big safety problems such as ignition.

As a way to improve the durability of a lithium secondary battery, a pattern is formed on a case forming the lithium secondary battery and a terminal reinforcing structure is applied, which enables stable electrochemical driving in spite of bending and distortion which is a repeatedly applied force.

Meanwhile, in a flexible environment, the case may be broken by repeated bending and distortion and a short circuit may occur due to the misalignment and deviation of internal electrodes, which may cause the risk of ignition or explosion. The internal short circuit causes excessive current flow in proportion to a contact area between a positive electrode and a negative electrode, and, thus, a lot of heat is generated. In this case, a secondary short circuit may additionally occur, and, thus, there is the risk of ignition and explosion.

In general, all electrodes in a winding type battery or a general stacked type battery are connected to the outside, and, thus, an internal short circuit occurs when the electrodes and a separator are damaged due to an external impact.

When the internal short circuit occurs as described above, even if an internal electrode or the outermost electrode, which may be a part of an electrode assembly, is broken, there may be a problem that the capacity is reduced. However, a current can flow to the outside of the electrode assembly, and, thus, there is no problem in the operation of the battery. However, when the battery is continuously used with the internal electrode that is broken or cut, there may be a problem of safety.

To overcome a problem that when an external force is applied to an electrode assembly included in a conventional pouch type battery, the breakage of the electrode assembly and the lack of an electrolyte therein occur, Korean Patent Laid-open Publication No. 10-2016-0090104 discloses an electrode assembly for a flexible battery in which a reinforcing member is provided on one side of the electrode assembly to suppress breakage even when an external force is applied thereto.

Patent Document 1: KR10-2016-0090104A

DISCLOSURE OF THE INVENTION

Problems to be Solved by the Invention

The present disclosure provides a structure for inducing cutting of the outermost electrode equipped with an electrode lead connection tab before the breakage of a case forming a battery and an internal short circuit occur by adjusting pattern intervals of the case and thus for securing the safety in use.

Means for Solving the Problems

To solve the above-described problem, a lithium ion secondary battery according to the present disclosure includes: an electrode assembly; and a case having a structure in which upper stamped portions and lower stamped portions are repeatedly stamped to cover the outside of the electrode assembly, and the upper stamped portions and the lower stamped portions form a corrugated pattern, and the electrode assembly includes: one or more unit cells each equipped with a pair of electrodes having different polarities with a separator interposed therebetween; an electrode mixture coated on one or both surfaces of the pair of electrodes; and electrode tabs protruded from the respective electrodes and not coated with the electrode mixture, and the electrode tabs include an electrode parallel connection tab and an electrode lead connection tab, and any one or more of the electrode parallel connection tab and the electrode lead connection tab is formed on the electrodes, and the corrugated pattern has various intervals.

The electrode assembly includes an outermost negative electrode placed on an outermost region and an outermost positive electrode placed as one body on the inside of the outermost negative electrode, and each of the outermost negative electrode and the outermost positive electrode is equipped with the electrode parallel connection tab and the electrode lead connection tab.

In a state where the width of each of the upper stamped portions and the lower stamped portions is set to X which is equal to a basic pattern interval, an interval Y of the corrugated pattern in a partial region of the case varies in the range of $X<Y\leq5\times$.

The electrode assembly further includes a reinforcing tab welded and fixed on any one electrode lead connection tab among the electrode tabs included in the electrode assembly.

A tab-lead joint portion having a structure in which the electrode lead connection tab and an electrode lead are located using the reinforcing tab is inserted and aligned in the separator.

The electrode lead joined on any one electrode lead connection tab among the electrode tabs included in the electrode assembly further includes a bending structure that is bent in an 180° opposite direction toward the outside of the electrode assembly while it is welded toward the electrode assembly.

A tab-lead joint portion in which the electrode lead connection tab and the electrode lead having the bending structure are joined to each other is inserted and aligned in the separator.

One surface of the outermost negative electrode placed on each of the uppermost stage and the lowermost stage of the electrode assembly is coated with the electrode mixture.

Effects of the Invention

According to the present disclosure, when tensile stress and compressive stress caused by external bending are repeatedly applied onto the electrode assembly, a portion of the outermost electrode in the electrode assembly corresponding to a different pattern of the case is damaged and cut, and, thus, the current is cut off. Therefore, the function of the battery is lost and the safety in use can be secured.

That is, when a bending test is performed on the electrode assembly while the electrode assembly is charged or discharged, a portion of the outermost electrode facing a portion of the case covering the electrode assembly where a pattern has a relatively larger width than a basic pattern has a relative difference in thickness because the distance between the negative electrode, which is the outermost electrode, and the positive electrode placed on the inside of the negative electrode increases and a resistance increases, and, thus, lithium remains within the outermost electrode. It can be seen that if a test for bending and warpage caused by an external force is repeatedly performed in a state where the electrode has a difference in thickness, the outermost electrode can be intentionally cut.

Also, as the charge/discharge proceeds, the electrode expands and contracts in volume. A portion of the electrode corresponding to a different pattern from the basic pattern continues to expand in volume and is locally applied with severer stress caused by repeated warpage and bending from the outside than the other portion.

When the outermost electrode equipped with an electrode lead connection tab and a parallel connection tab is cut, only one passage for electrons in an active material to move to the outside is cut, and, thus, the current is cut off. Therefore, while the function of the battery is lost, the safety in use can be secured.

The outermost electrode and the other general electrodes included in the electrode assembly according to the present disclosure are connected by a parallel connection tab, and on the outermost electrode, a terminal is formed on an electrode lead connection tab. When an external force, such as bending and distortion, is applied from the outside, the outermost electrode is damaged and cut preferentially over the general electrodes placed on the inside of the outermost electrode. If the outermost electrode equipped with the electrode lead connection tab is cut, the general electrodes connected by the parallel connection tab are shut down while a current is cut off. Therefore, the capacity is sharply reduced and the battery cannot perform its original function.

That is, cutting of the outermost electrode equipped with the electrode lead connection tab is induced before the breakage of the case and an internal short circuit occur by appropriately adjusting the type and placement of the outermost electrode in the electrode assembly, and, thus, the current is cut off. Therefore, the safety of the battery can be secured.

According to the present disclosure, the flexibility of the battery can be improved by using the shape and the stacked structure of the electrode equipped with the parallel connection tab and the electrode lead connection tab and cutting of the outermost electrode can be intentionally induced before an internal short circuit caused by the breakage of the case and the precipitation of lithium occurs. Therefore, the function of the battery can be lost and the safety in use of the battery can be secured.

BEST MODE FOR CARRYING OUT THE INVENTION

Hereafter, a flexible battery according to the present disclosure will be described with reference to the accompanying drawings.

The following exemplary embodiments are provided only for understanding of the present disclosure but not intended to limit the right scope of the present disclosure. Therefore, the inventions that perform the same functions in the same scope as the present disclosure are also included in the right scope of the present disclosure.

Hereinafter, some embodiments of the present disclosure will be described in detail with reference to the accompanying drawings. When reference numerals refer to components of each drawing, although the same components are illustrated in different drawings, the same components are referred to by the same reference numerals as possible. Further, if it is considered that description of related known configuration or function may cloud the gist of the present disclosure, the description thereof will be omitted.

Figure 1:
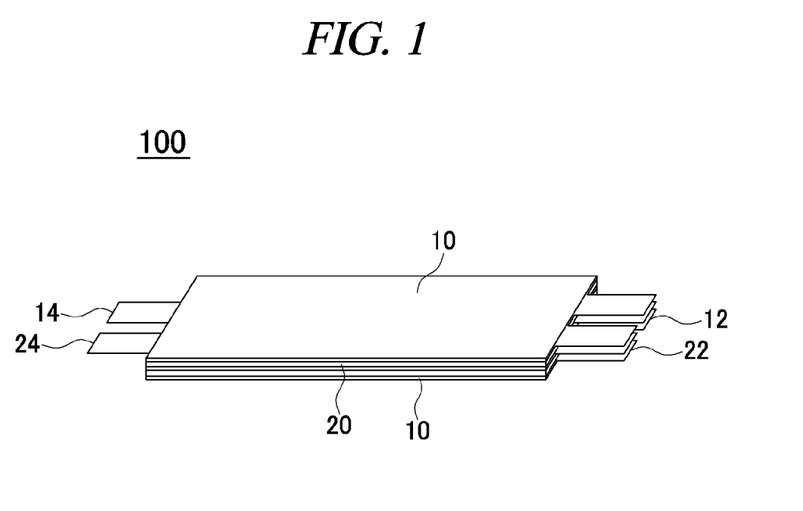
FIG. 1 is an illustration of an exemplary configuration of an electrode assembly included in a flexible battery according to the present disclosure.
Figure 2:
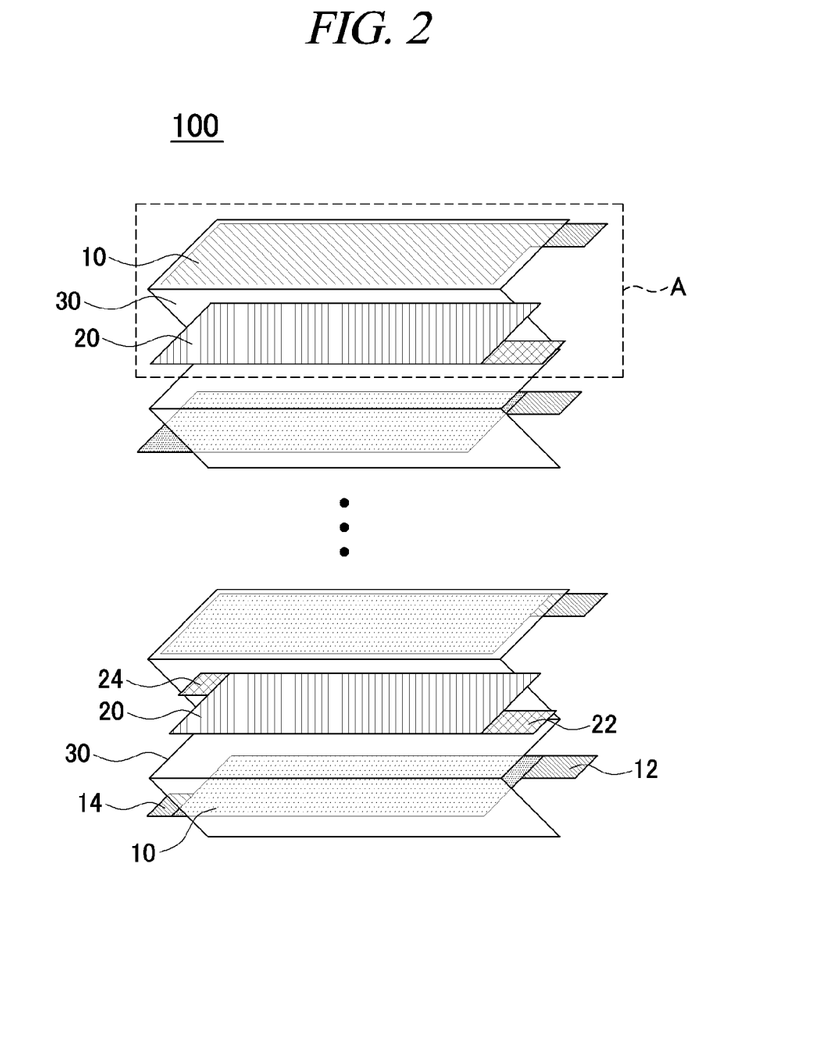
FIG. 2 and FIG. 3 are exploded views of the electrode assembly in which a negative electrode is placed as the outermost electrode according to an embodiment of the present disclosure.
Figure 3:
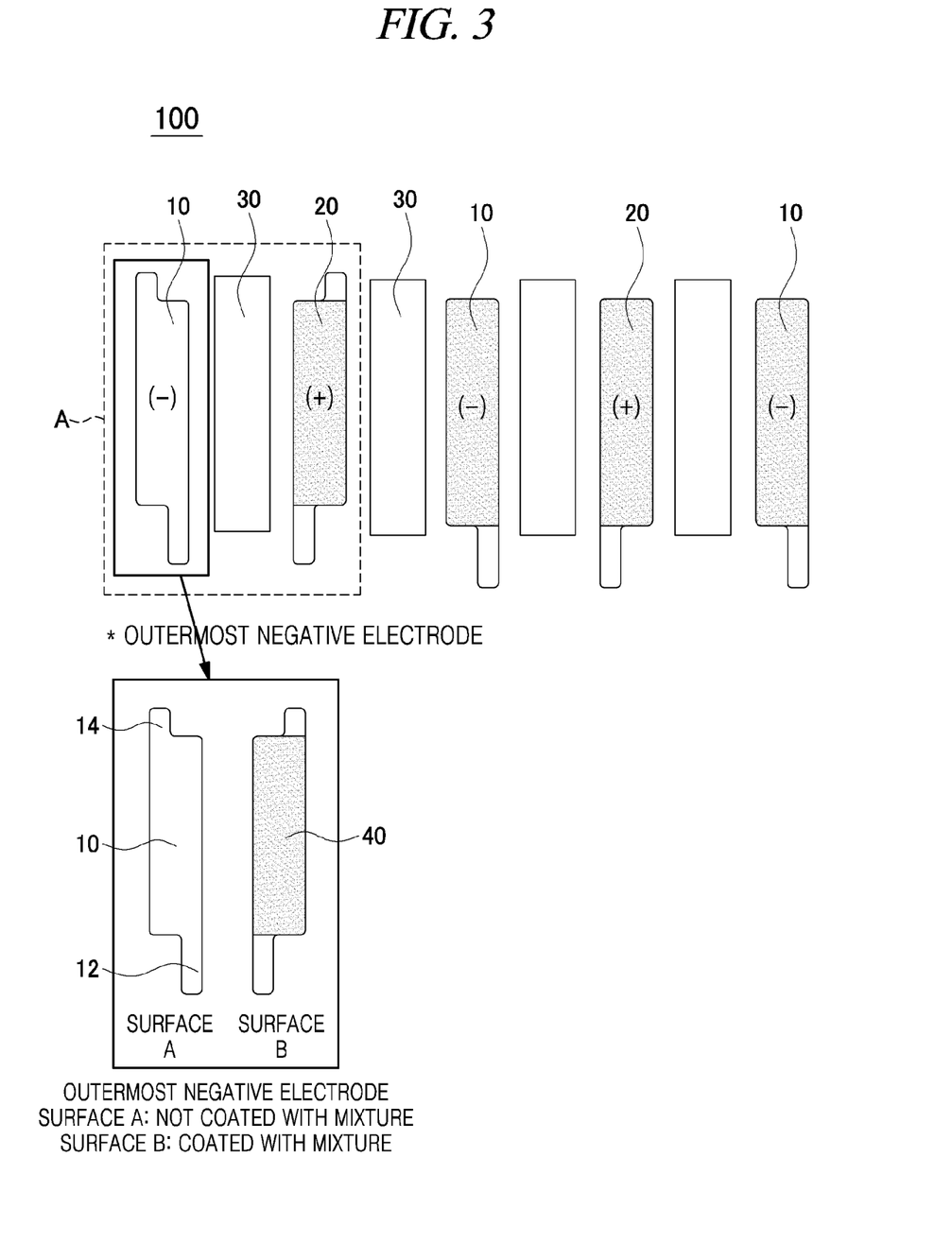

Referring to FIG. 1 to FIG. 3, an electrode assembly that can induce cutting of the outermost electrode by adjusting pattern intervals of a case and thus improve the stability of a battery according an embodiment of to the present disclosure will be described.

An electrode assembly 100 includes unit cells A each including a negative electrode 10 and a positive electrode 20 with a separator 30 interposed therebetween, an electrolyte serving as an ion transport medium between the negative electrode and the positive electrode, and electrode tabs protruded from the electrodes and used for electrode parallel connection and electrode lead connection depending on the application. Any one or more of the electrodes including the negative electrode 10 and the positive electrode 20 is equipped on both sides with an electrode parallel connection tab and an electrode lead connection tab spaced apart from each other. For example, a certain outermost negative electrode 10 placed on the lowermost stage of the electrode assembly 100 is equipped with a negative electrode parallel connection tab 12 and a negative electrode lead connection tab 14, and a certain positive electrode placed on a stage right on the outermost negative electrode is equipped with a positive electrode parallel connection tab 22 and a positive electrode lead connection tab 24. That is, a negative electrode and a positive electrode each equipped with an electrode parallel connection tab and an electrode lead connection tab are placed as one body on the lowermost stage of the electrode assembly.

In the electrodes, one or both surfaces of each electrode serving as a current collector are coated with an electrode mixture and the electrode parallel connection tabs and the electrode lead connection tabs are protruded from the electrodes. The electrode parallel connection tabs and the electrode lead connection tabs are exposed without being coated with the electrode mixture.

Some of the multiple electrodes having the same polarity are connected to each other through an electrode parallel connection tab. That is, multiple negative electrodes 10 and multiple positive electrodes 20 are electrically connected in parallel with each other by a tab-tab joint portion connecting electrode tabs.

The electrode assembly is electrically connected through the electrode lead connection tab to an electrode lead exposed to the outside of a case. The separator physically separates the electrodes, but allows ions contained in the electrolyte to pass through.

As for the negative electrodes placed on the uppermost stage and the lowermost stage of the electrode assembly, only one surface of each negative electrode may be coated with a negative electrode mixture 40.

The electrode parallel connection tab 12 or 22 protruded on the negative electrode 10 or the positive electrode 20 electrically connects electrodes having the same polarity in parallel with each other. Tab-tab joint portions connected in parallel with each other are located on the separator covering an outer surface of the outermost electrode placed on the uppermost stage or the lowermost stage of the electrode assembly and then finished and taped.

In the present disclosure, a tab-tab joint portion where the electrode parallel connection tabs 12 and 22 on the electrode are connected in parallel with each other and a tab-lead joint portion where the electrode lead connection tabs 14 and 24 and the electrode lead are connected to each other are electrically connected and joined to each other by any one of joint methods including spot welding, ultrasonic welding, laser welding, and joining with a conductive adhesive.

All the electrodes placed on the uppermost stage and the lowermost stage of the electrode assembly are negative electrodes. However, this is just an example and the present disclosure is not limited thereto. In the present disclosure, the uppermost and lowermost electrodes may be placed within the electrode assembly as any one of combinations including negative electrode/negative electrode, positive electrode/negative electrode positive, negative electrode/positive electrode, and positive electrode/positive electrode.

The electrode assembly according to the present disclosure further includes a separate reinforcing tab 50 on the electrode lead connection tabs 14 and 24 placed on one side of the electrode assembly. The reinforcing tab is joined to an electrode lead, and, thus, the tab-lead joint portion having an overlapping structure for the electrode lead connection tabs 14 and 24 and the electrode lead is formed using the reinforcing tab. The reinforced joint method for the electrode lead connection tabs 14 and 24 and the electrode lead using the reinforcing tab is applied to at least any one of a positive electrode tab and a negative electrode tab.

The reinforcing tab reinforces the strength of joint portions between the respective electrode lead connection tabs 14 and 24 and the electrode lead and thus physically reinforces the joint portions. For example, on an upper stage of the electrode lead connection tab extended from the electrode of the electrode assembly, the reinforcing tab formed of a homogeneous or heterogeneous metal and having a thickness one to five times greater than the electrode lead connection tab is overlapped and welded. The overlapped reinforcing tab and the electrode lead connection tab may have the same thickness or different thicknesses. The overlapped reinforcing tab may have a width of 3 mm to 5 mm and a length of 2 mm to 4 mm. However, this is just an example and the present disclosure is not limited thereto.

Specifically, the electrode lead assembled on the overlapped reinforcing tab to the electrode lead connection tab may have a width of 2 mm to 3 mm and a length of 0.5 mm to 1 mm. However, this is just an example and the present disclosure is not limited thereto. The current collector of the electrode in the present disclosure may be any one of a group consisting of aluminum, stainless steel and copper, and the electrode lead may be formed of any one material of a group consisting of aluminum, nickel and nickel-coated copper. The overlapped reinforcing tab on the tab-lead joint portion for the electrode lead connection tab and the electrode lead is formed into any one shape of a group consisting of a circular shape, an oval shape and a polygonal shape.

In the electrode assembly according to the present disclosure, an electrode lead bending joint structure may be joined on the electrode lead connection tabs 14 and 24.

While the electrode lead is placed in parallel above the electrode lead connection tab, a part of an end of the electrode lead is welded on an upper end of the electrode lead connection tab. In this state, the electrode lead is bent 180°, and, thus, the electrode lead is bent from the electrode lead connection tab toward the outside of the electrode assembly. Accordingly, it is possible to obtain a joint reinforcing structure between the electrode tab and the electrode lead with a minimized local mechanical load in a flexible environment. This method of joining the electrode lead connection tab and the electrode lead by bending can be applied to at least any one of a positive electrode tab and a negative electrode tab. An electrode lead 60 joined on the electrode lead connection tab may have a width of 2 mm to 3 mm and a length of 1 mm to 3 mm. However, this is just an example and the present disclosure is not limited thereto.

Meanwhile, the tab-lead joint portions in which the electrode lead connection tabs 14 and 24 are joined to the electrode lead using the reinforcing tab and the tab-lead joint portion in which the electrode lead connection tab is joined to the electrode lead having a bending tab structure are inserted/aligned in the separator. Accordingly, it is possible to protect a flexible battery by suppressing the exposure of a terminal portion to the outside which is the greatest weakness of the flexible battery.

Figure 4:
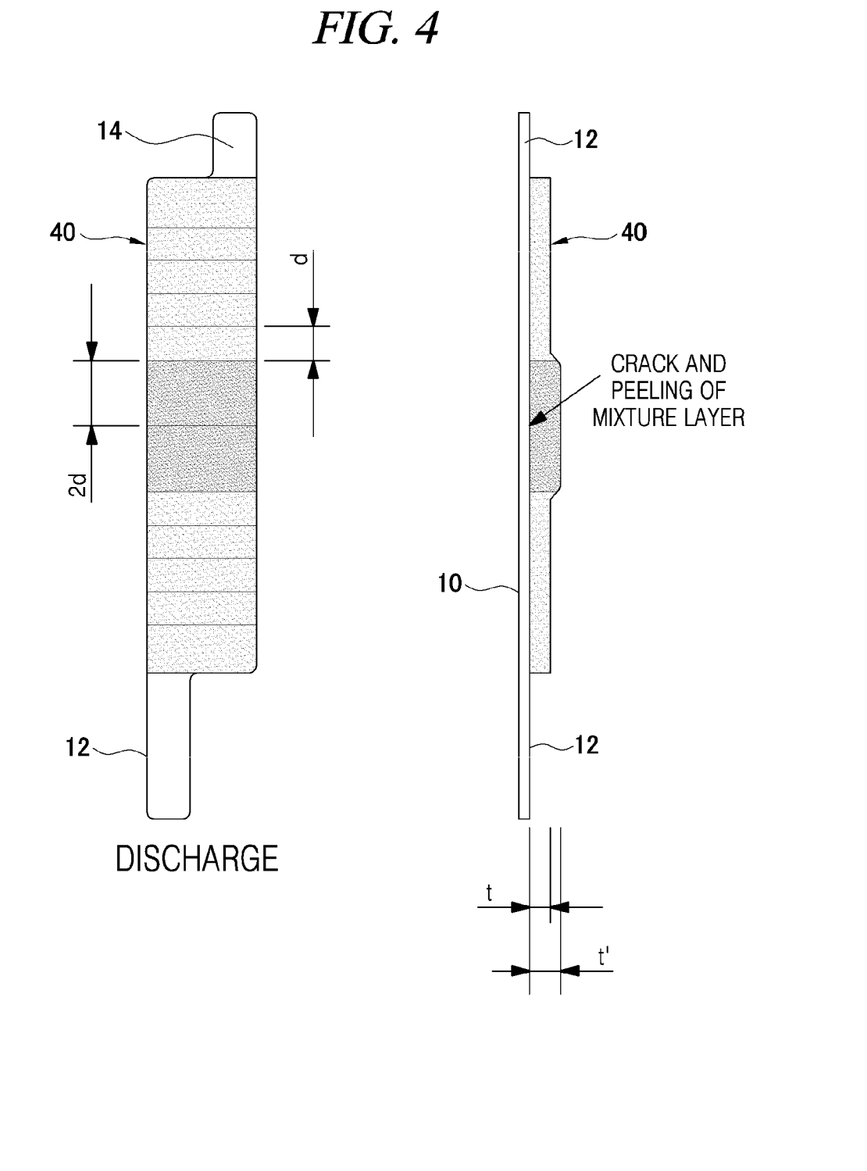
FIG. 4 and FIG. 5 illustrate a crack and desorption of a mixture layer caused by a difference in thickness and occurring on the outermost negative electrode when pattern intervals of a case covering the electrode assembly are adjusted.
Figure 5:
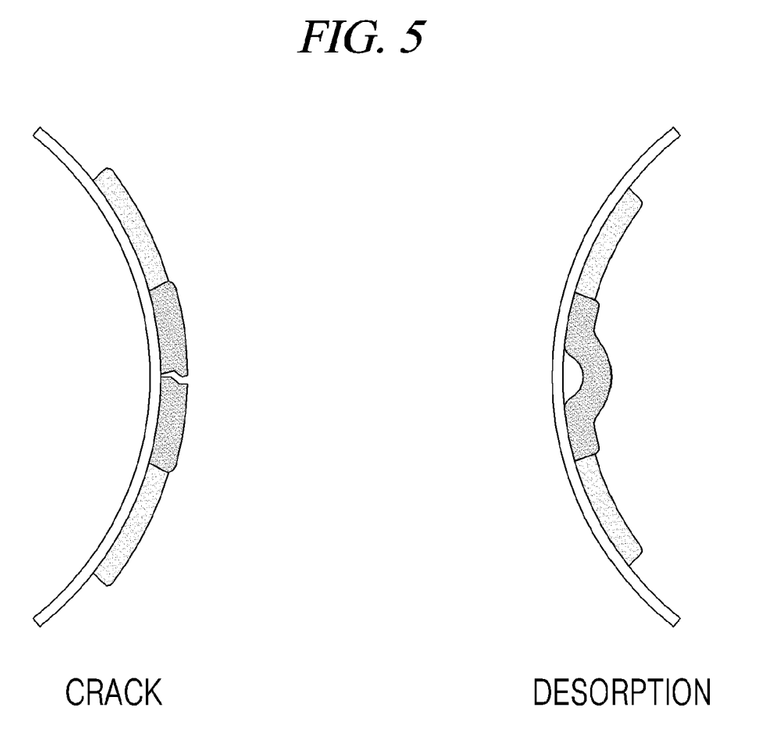

FIG. 4 and FIG. 5 illustrate a crack and desorption of a mixture layer caused by a difference in thickness and occurring on the outermost electrode when pattern intervals of a case covering the electrode assembly are adjusted.

A corrugated pattern formed on the case has continuous mountains and valleys along a longitudinal direction of the case. If an electrode assembly is provided within the case having the corrugated pattern, a stress is locally applied to a region with a relatively large difference in pattern interval.

Specifically, it is possible to make a change in pattern interval on a middle region of the entire length of the case, but the present disclosure is not limited thereto. It is possible to make a difference in pattern interval in any region of the case.

Herein, it is possible to induce cutting of the outermost electrode equipped with a parallel connection tab and an electrode lead connection tab and facing a region of the case with a large pattern interval before the breakage of the case and an internal short circuit occur during a bending test.

Hereinafter, a result of bending and disassembling the case with a difference in pattern interval in a state where the electrode assembly is built in the case will be described with reference to FIG. 4 and FIG. 5.

In general, as the charge/discharge of a lithium secondary battery proceeds, the negative electrode expands and contracts in volume due to insertion/desorption of lithium ions. The state of charge (SOC) indicates the battery capacity of the secondary battery and indicates the state of the secondary battery from 0% to 100%. The method of measuring the SOC includes a chemical method using a specific gravity of an electrolyte and pH, a voltage method, a current integration method (column counting) in which a current of a battery is measured and integrated with respect to time and a pressure method in which an internal pressure of a battery is calculated. In the present disclosure, the thickness of the negative electrode was measured in a fully discharged state (SOC of 0%) and a fully charged state (SOC of 100%) simply by using a voltage. In general, when a negative electrode is graphite, a volume expansion of 7% on average and up to 10% occurs in a fully charged state (SOC of 100%).

The disassembling of the battery is performed in a dry room where the temperature and the humidity are kept constant so that a change in thickness caused by a reaction with the outside air cannot be made.

It can be seen that a difference in thickness is made on the outermost electrode directly facing a portion on the surface of the case where a difference in corrugated pattern interval has been made.

It can be seen that the interval between the internal electrodes of the separator is increased at a portion with a large pattern interval. That is, the negative electrode, which is the outermost electrode, and the positive electrode need to face each other as close as possible with the separator interposed therebetween. However, as the bending test proceeds, the distance between the electrodes adjacent to the case's portion with a relatively large pattern interval increases. Thus, the distance between the negative electrode, which is the outermost electrode, and the positive electrode increases and the resistance increases.

If a high electrode resistance is applied to the negative electrode, which is the outermost electrode, and the positive electrode, the specific capacity decreases, and lithium cannot move toward the positive electrode during the discharge and remains in the negative electrode.

In summary, at the time of bending test and discharge of the flexible battery in which pattern intervals of the case are adjusted according to the present disclosure, an electrode thickness difference t'−t is made between an electrode thickness t' corresponding to the portion with a large pattern interval and an electrode thickness t not corresponding thereto.

In an embodiment, a thickness difference t'−t is made in the portion because the distance between the electrodes facing a different pattern of a specific region other than a normal pattern interval of the electrodes in the electrode assembly increases due to a difference in pattern interval between an electrode portion where the case has a pattern interval of d and an electrode portion where the case has a pattern interval of 2 d or the discharge is insufficiently performed due to the electrode resistance, and it can be seen from numerous specimens that the thickness difference t'−t is 2% to 4% of the thickness of a negative electrode mixture layer.

It can be seen that when the bending test is performed while the charge/discharge proceeds, a relatively thick portion of the electrode is cut by bending about 1,500 times to 2,500 times due to the thickness difference in a discharged state.

Further, as the charge/discharge proceeds, the electrode expands and contracts in volume. A portion of the electrode facing a different pattern of a specific region other than a normal pattern interval continues to expand in volume and is locally applied with severer stress caused by repeated warpage and bending from the outside than the other portion. Eventually, the mixture layer is cracked and desorbed from the current collector, and, thus, noise is generated. Therefore, the normal function of the battery cannot be performed.

Figure 7:
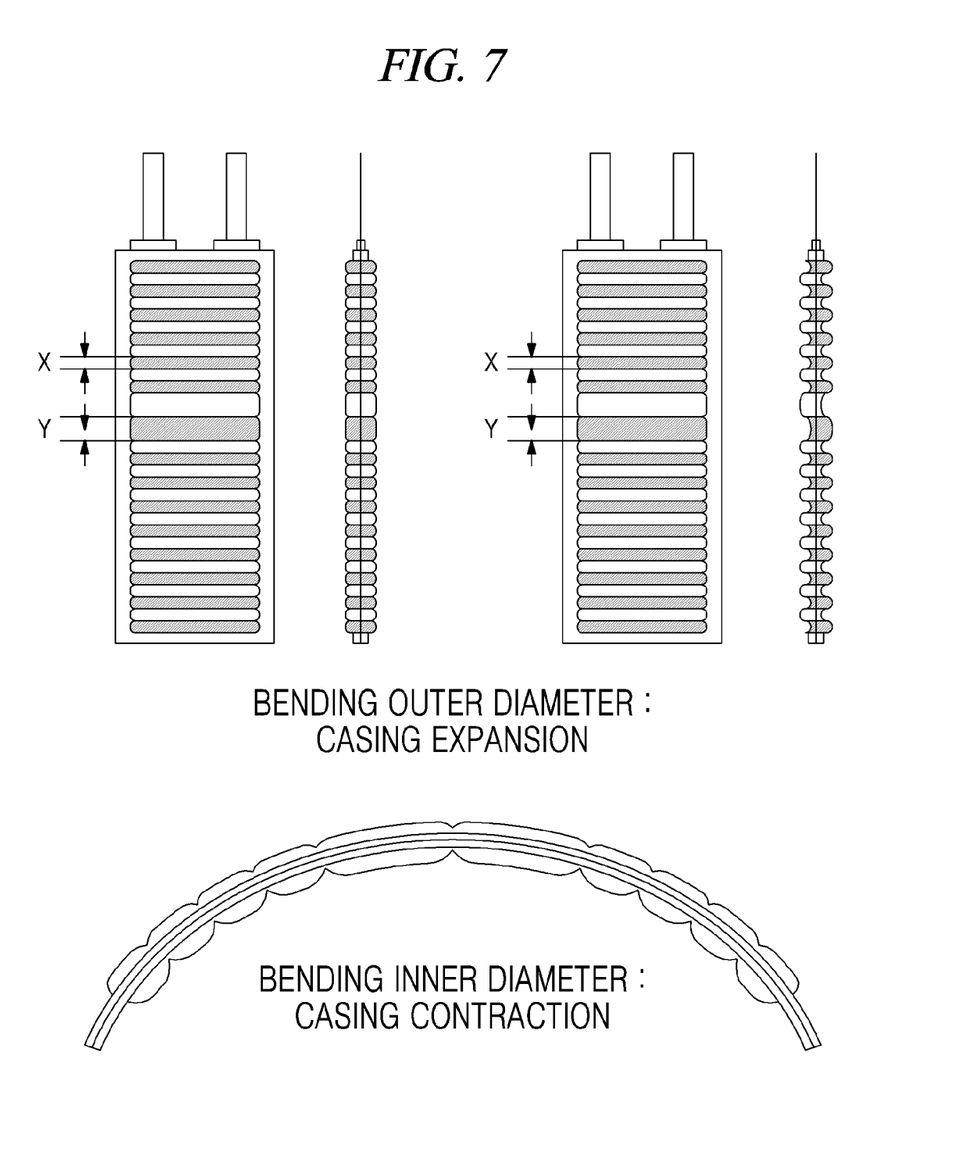
FIG. 7 illustrates a flexible battery having a case covering an electrode assembly according to the present disclosure.

As shown in FIG. 7, the pattern of the case may have different intervals X and Y. Herein, desirably, Y, which is a different corrugated pattern interval in a partial region of the case, equals to 5× which is five times wider than X that is the basic pattern interval. This is because it is possible to effectively induce cutting of the outermost electrode while maintaining flexibility against a force applied from the outside according to the above-described pattern interval design.

If Y, which is a different corrugated pattern interval in a partial region of the case, is equal to or less than the basic pattern interval X, cutting of the outermost electrode cannot be effectively induced and the pattern of the case cannot be easily formed.

If it exceeds 5×, the performance as a flexible battery cannot be realized. A repeatedly stamped pattern on the case enables the flexible battery to be compressed and tensioned in movements such as bending, distortion or crumpling. When it exceeds 5×, it is the same as bending a non-patterned general battery. Therefore, it is natural that the case and the electrode are damaged at the same time.

Figure 6:
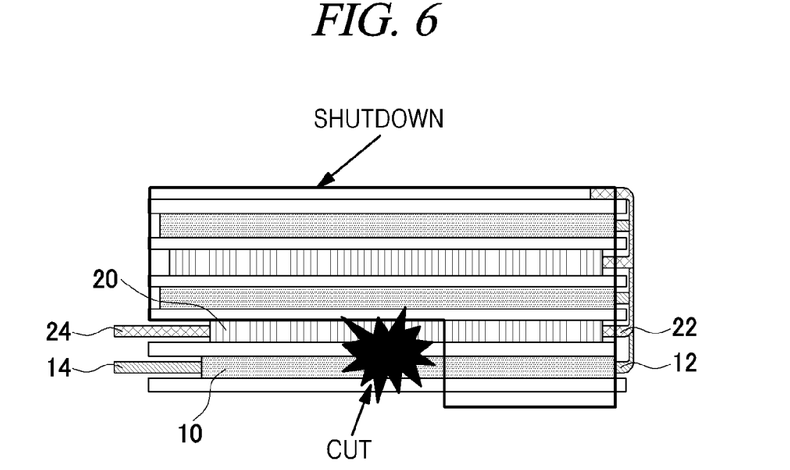
FIG. 6 shows that when the outermost electrode is cut, the other internal electrodes included in the electrode assembly are put in a shutdown state.

FIG. 6 shows that when the outermost electrode is cut, the other internal electrodes included in the electrode assembly are put in a shutdown state.

Specifically, a plurality of batteries included in the electrode assembly is connected to each other by the parallel connection tab o the right side, and a terminal is formed at an electrode lead connection tab on the outermost electrode on a lower stage of the plurality of batteries.

In this state, when an external force such as bending and distortion is applied onto the electrode assembly from the outside, the outermost electrode placed on the lower stage is damaged and cut preferentially over the electrodes placed inside the electrode assembly.

In this case, if the outermost electrode equipped with the electrode lead connection tab is broken, the electrodes connected by the parallel connection tap are not supplied with a current and are put in a shutdown state. Therefore, the capacity is sharply reduced and the battery cannot perform its original function. Accordingly, unlike conventional batteries, the battery of the present disclosure provides a function to suppress the risk of ignition that may occur due to an internal short circuit when it is continuously used in spite of damage to the internal electrodes.

To this end, the present disclosure includes cutting of the electrode equipped with the electrode lead connection tab before the breakage of the case and an internal short circuit occur by appropriately using the type and placement of the outermost electrode. This intended structure can be applied to a device that protects a battery safely against the risk of carelessness or excessive bending of the user and needs to secure and control the performance of a flexible battery when the flexible battery is bent a predetermined number of times or more by an external force.

Figure 8:
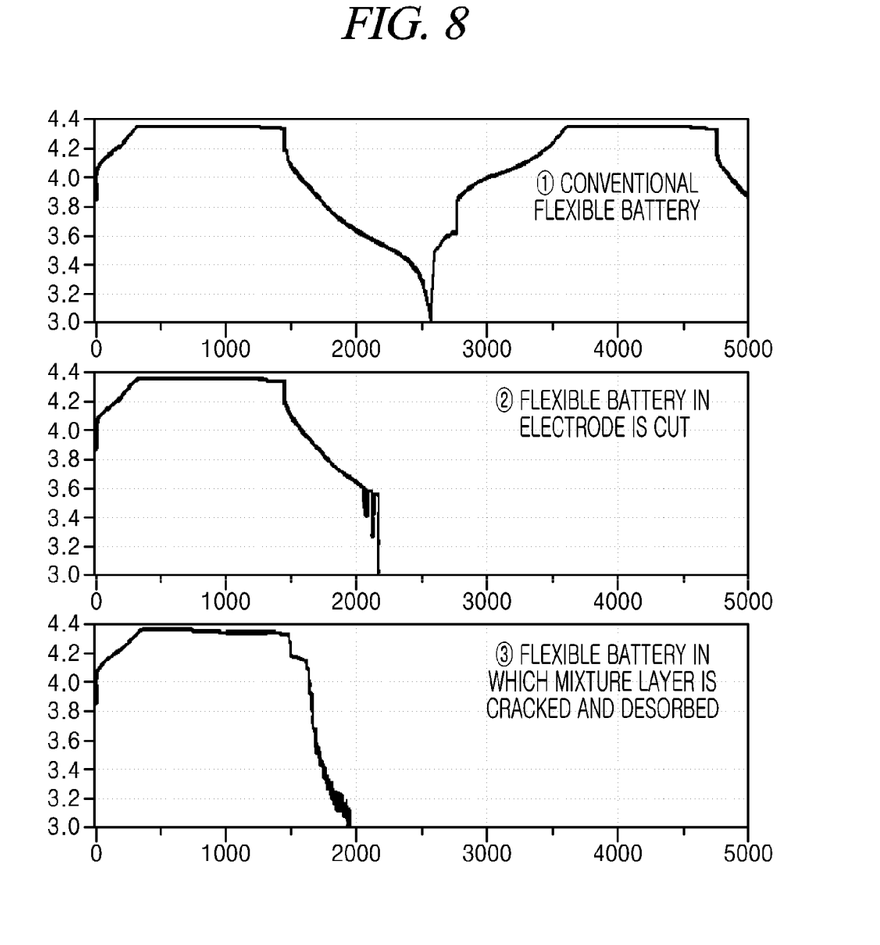
FIG. 8 shows the results of repeated bending tests on a conventional flexible battery and the flexible battery according to the present disclosure.

FIG. 8 shows the results of repeated bending tests on a conventional flexible battery and the flexible battery according to the present disclosure. Specifically, the conventional flexible battery, the flexible battery in which the electrode is cut due to different pattern intervals of the case, and the flexible battery in which a mixture layer is cracked and desorbed are shown in sequence from above.

The results of the charge/discharge and bending tests (25 cpm) of the respective flexible batteries will be described.

The conventional flexible battery showed a normal electrochemical operation even after bending 5,000 times. However, it can be seen that when the flexible battery having a case with different pattern intervals in a partial region was bent about 2,000 times, a small noise was generated starting from a discharge of 3.6 V and the voltage dropped to be equal or less than the operating voltage at the same time when the outermost negative electrode was cut.

Referring to the graph at the bottom of FIG. 8, in a state where the mixture layer coated on the electrode in the flexible battery having a case with different pattern intervals in a partial region was cracked and desorbed, the mixture layer is primarily desorbed from the current collector in early stage of discharge of about 4.2 V and the voltage sharply dropped and the noise was continuously generated. Also, when the mixture layer and the current collector were secondly cracked, the capacity also dropped sharply and the voltage dropped to be equal or less than the operating voltage.

According to a result of many tests as described above, the corrugated pattern on the case is differently formed, so that cutting of the electrode and a crack or desorption of the mixture layer occurs at a local site on the outermost electrode when bending is performed about 1,500 times to 2,500 times. Thus, the safety in use of the battery can be secured by intentionally designing damage and cutting of the outermost electrode before excessive number of times of bending that is highly likely to cause breakage of the case or incur an internal short circuit caused by the precipitation of lithium.

The present disclosure relates to a structure in which when tensile stress and compressive stress caused by bending from the outside are repetitively applied to an electrode assembly, a portion corresponding to a different pattern of a case of the outermost electrode included in the electrode assembly is cut, and, thus, the current is cut off. This structure can be applied to a device that protects a battery safely against risks caused by carelessness or excessive bending of the user and needs to secure and control the performance of a flexible battery when the flexible battery is bent a predetermined number of times or more by an external force.

INDUSTRIAL APPLICABILITY

The present disclosure can be applied to a device that needs to secure and control the performance of a flexible battery when the flexible battery is bent a predetermined number of times or more by an external force.

We claim:

1. A secondary battery, comprising:
an electrode assembly; and
a case covering an outside of the electrode assembly and has a corrugated pattern including upper stamped portions and lower stamped portions that are repeatedly formed,
wherein the electrode assembly includes:
one or more unit cells each having a pair of electrodes having different polarities with a separator interposed therebetween;
an electrode mixture coated on one or both surfaces of the pair of electrodes; and
electrode tabs protruding from respective ones of the pair of electrodes, the electrode tabs including an electrode parallel connection tab and an electrode lead connection tab, wherein
the electrode lead connection tab is formed on a first end of an electrode placed on an outermost region among electrodes included in the electrode assembly,
the electrode parallel connection tab is formed on a second end opposite to the first end of the electrode placed on the outermost region, and
a first interval corresponding to a first region of the corrugated pattern is wider than a second interval corresponding to a second region of the corrugated pattern such that a partial region of the electrode including the electrode lead connection tab and the electrode parallel connection tab placed on the outermost region corresponding to the first region can be induced to be cut before breakage of the case during repeated bending of the secondary battery, the first region disposed corresponding to the partial region at between the electrode lead connection tab and the electrode parallel connection tab.

2. The secondary battery of claim 1, wherein
the electrode placed on the outermost region includes an outermost negative electrode placed on an outermost region and an outermost positive electrode placed adjacent to and facing the outermost negative electrode with a separator interposed therebetween, and
each of the outermost negative electrode and the outermost positive electrode is equipped with the electrode parallel connection tab and the electrode lead connection tab.

3. The secondary battery of claim 1, wherein when a width of the second interval for each of the upper stamped portions and the lower stamped portions is set to X, which is equal to a basic pattern interval, a width of the second interval Y for the at least one of the upper stamped portions and lower stamped portions is in a range of $X<Y \leq 5x$.

4. The secondary battery of claim 1, wherein the electrode assembly further includes a reinforcing tab joined to the electrode lead connection tab.

5. The secondary battery of claim 1, wherein the secondary battery comprises an electrode lead that includes a bending structure that is formed on the electrode lead connection tab to be bent from the electrode assembly toward the outside of the electrode assembly.

6. The secondary battery of claim 4, wherein a tab-lead joint portion that is located using the reinforcing tab is inserted and aligned in the separator.

7. The secondary battery of claim 5, wherein a tab-lead joint portion in which the electrode lead connection tab and the electrode lead having the bending structure are joined to each other is inserted and aligned in the separator.

8. The secondary battery of claim 2, wherein one surface of the outermost negative electrode placed on each of an uppermost stage and a lowermost stage of the electrode assembly is coated with the electrode mixture.

* * * * *